April 22, 1958 W. F. ALLER 2,831,257
GAUGING DEVICE
Filed May 1, 1953
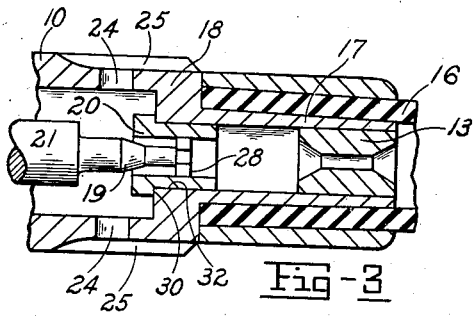
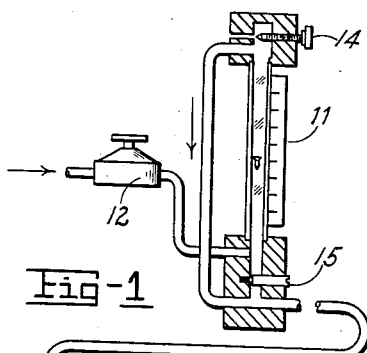
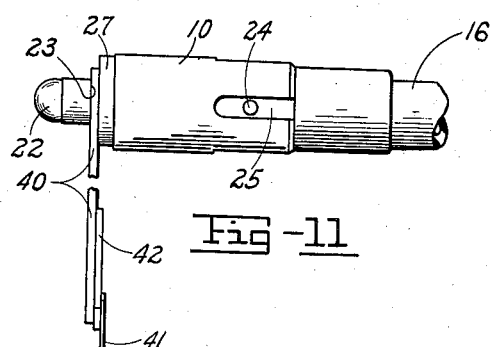
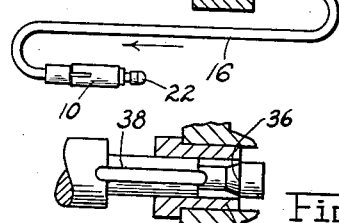
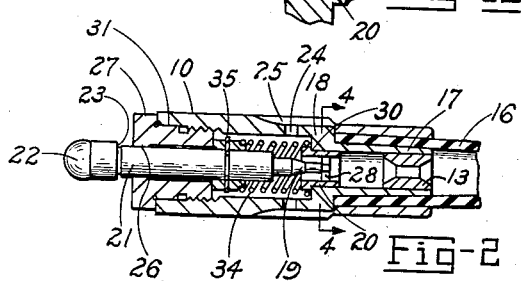
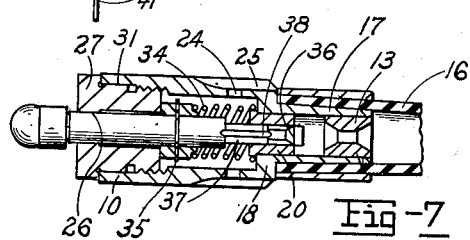
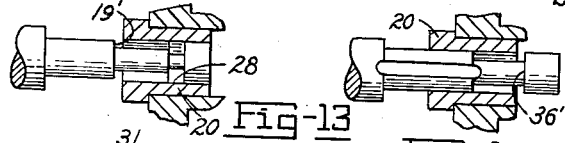
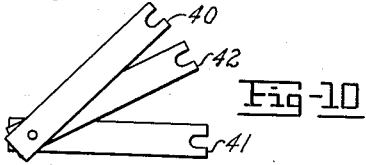
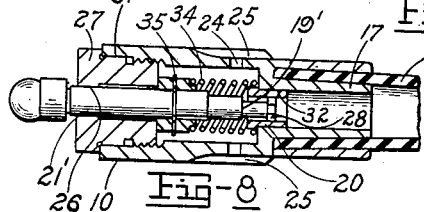
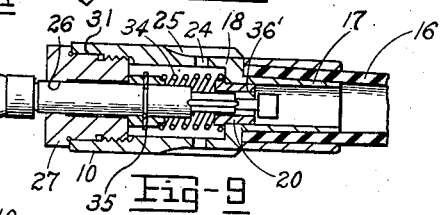
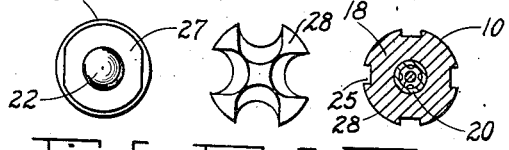
INVENTOR.
W. F. Aller
BY
Edward T. Noi
atty

United States Patent Office 2,831,257
Patented Apr. 22, 1958

2,831,257

GAUGING DEVICE

Willis Fay Aller, Dayton, Ohio, assignor, by mesne assignments, to The Sheffield Corporation, a corporation of Delaware Application May 1, 1953, Serial No. 352,518

13 Claims. (Cl. 33—172)

This invention relates to gauging devices utilizing work controlled fluid flow as an indication of workpiece dimensions and more particularly to an improved gauging head for use in such devices.

The use of air as a measuring medium has attained wide acceptance in industry where precise and repeated measurements are required. Air measuring systems usually involve two major components: a gauging head wherein a work controlled valve controls the amount of air escaping through the gauging head and an indicating instrument which indicates either the back pressure or the controlled velocity of flow resulting from work controlled movements of the valve. A recent innovation in this field has been the provision of gauging heads of smaller external dimensions. These heads are adapted for many gauging applications where mechanical and electrical devices are not practical and heretofore not subject to the employment of air gauging apparatuses. These small gauging heads can be grouped closely together for the measurement of closely spaced dimensions and can be placed wherever desired in crowded or remote situations where measurements have not before been possible. Because of their small size the manufacture of these gauging heads of almost universal application has been difficult and expensive. The matter of alignment of the work controlled valve plunger and the orifice with which it cooperates is extremely critical and has been difficult to attain with the precise dimensions required in such small units.

The provision of a sufficient measuring range of the work controlled value member and some provision to prevent damage of the orifice faces upon movements of the work controlled valve member beyond its measuring range has also been a feature which has not been attained in this type of gauging head.

It is accordingly an object of this invention to provide a gauging head of small dimensions and of simple and rugged construction which achieves accurate measuring results for use with gauging systems of the air flow type and for application wherever desired.

It is a further object of this invention to provide a gauging head of the character referred to wherein critical relationships between gauging head components have been minimized to therefore render the construction of such gauging heads as inexpensive as is practical.

It is a further object of this invention to provide a supporting structure for a work controlled valve plunger which involves two supporting means each of limited axial extent, relatively widely spaced along the length of the plunger whereby the alignment between these supports is not critical because of their limited axial extents.

It is a further object of this invention to provide a support as referred to in the object next above wherein the inner support for the plunger is guided within a passage at one end of which is located the controlled leakage orifice.

It is a further object of this invention to provide an orifice controlling surface on a work controlled plunger which has a maximum transverse dimension less than that of the orifice forming passage with which it is aligned whereby continued movement of the plunger into the passage beyond its orifice closing position can take place.

It is a further object to provide orifice controlling surfaces of any desired taper for cooperation with an orifice wherein a degree of taper can be provided depending upon the variation in leakage flow with plunger movements, or amplification, desired for the particular gauging operation.

It is a further object of this invention to provide a gauging head formed of a relatively few easily made parts including a separate orifice forming sleeve.

In order to provide a clear understanding of the exact nature of this invention and of the many desirable features incorporated herein, a detailed description of preferred forms or embodiments of this invention will now be given and reference will be made to the drawings which accompany and form a part of this specification.

Figure 1 discloses a gauging head attached to an indicating instrument, illustrated in section, Figure 2 shows a controllable orifice unit embodying this invention in longitudinal central section, Figure 3 is an enlarged portion of the section of Figure 2, Figure 4 is a section on line 4—4 of Figure 2, Figure 5 is a view of the outer end of the gauging head, Figure 6 is an enlarged end view of the guide at the inner end of the work controlled plunger, Figures 7–9 are modifications of the gauging head of this invention, Figure 10 discloses feeler gauges used in setting up operations, Figure 11 illustrates one of these feeler gauges in an operative association with the gauging head, and Figures 12 to 14 are enlarged portions of Figures 7 to 9 respectively.

This invention relates to the features and construction of an extremely compact gauge head or controllable orifice unit which is adapted for connection to a fluid pressure system and for work control in a gauging operation. Basically the controllable orifice unit includes an orifice to which fluid under pressure is supplied through a fluid flow metering device and a work controlled plunger which controls the leakage through the fluid leakage orifice in accordance with work displacements or dimensions. The unit can be mounted in a fixed position and the work presented thereto or the unit can be mounted on a movable carrier for movement to the work which it is to gauge. The gauging or indicating means of the fluid system respond to fluid flow and give an indication of the characteristic gauged by comparison with indications obtained when maximum and minimum masters are utilized. By the term "pressure" is meant any pressure either positive or negative with respect to atmospheric pressure, and by the terms "part," "work," or "workpiece" are meant any unit controlling means effective on the operating member of the unit to govern the size of the fluid leakage orifice in a gauging operation.

In Figure 1 is disclosed a gauge head or orifice controlling unit 10 embodying the present invention connected to an air flow instrument 11 to which air under pressure is supplied through a regulator 12 and flows upward through a tapered flow tube and to the gauge head. An indicator positions itself along the tube in accordance with the flow through the tube which is determined by the work controlled leakage through the gauge head. The instrument 11 has means at 14 to control a relief to atmosphere at the upper end of the tube and provides a float positioning adjustment. An amplification adjustment means at 15 controls the proportion of air bypassed directly to the gauge head. The unit 10 is disclosed in more detail and in section in Figure 2.

See Figures 2 and 3. Air is supplied to the unit 10, under pressure, through a flexible tube 16 connected to a reduced extension 17 of the unit body portion 18. An orifice insert 13 can be provided to effect a savings in air consumption but it allows a sufficient flow for all gauging requirements. The flow of air through the unit 10 is controlled by the proximity of orifice controlling surface 19 to one end of the orifice forming sleeve 20. The orifice controlling surface 19 is positioned in accordance with the axial movement of a plunger 21 which has a work contactor 22 at its outer end. After the air passes through the orifice forming sleeve 20 it exhausts to atmosphere through radial passages 24 and axial grooves 25 in the surface of the unit 10.

The plunger 21 is supported adjacent its inner and outer ends for axial sliding in the body portion 18. At its outer end it is slidable in an inner projection 26 of limited axial extent in a bushing member 27 which is threaded into the body portion 18. At its inner end the plunger has a guide portion 28 which is slidable in the orifice forming sleeve 20.

The body portion 18 has a longitudinal passage therethrough formed by a pair of aligned cylindrical hole portions with the inner one continuing through extension 17 of smaller diameter than the outer. Where these holes join a shoulder 30 is formed and the orifice forming sleeve 20 is inserted into the inner hole portion and a shoulder thereon abuts against the shoulder 30 to locate the sleeve axially in the body portion 18.

The bushing 27 is centered in the outer hole portion by a surface 31. This surface 31 and the length of the inner hole portion which is engaged by the orifice forming sleeve 20 are maintained relatively coaxial. When the bushing 27 and the sleeve 20 are supported by these reference surfaces their inner surfaces in which the body of the plunger 21 and the plunger guide 28 are slidable are also coaxially arranged and the plunger 21 is maintained in alignment with the orifice which it controls. Because the plunger is supported at widely spaced points along its length by the inner surface 26 and the guide 28, each of which is of limited extent along the axis of the plunger, some error in the alignment of the bushing surface 26 and the inner surface of the orifice forming sleeve can be tolerated without binding the plunger 21 and the coaxial relationships are not as critical as they would be if the plunger was supported for sliding in a surface which extended a substantial distance along the plunger length. The guide 28 on the plunger 21 will insure that the orifice controlling surface 19, which has a maximum diameter less than the internal diameter of the orifice forming sleeve 20, will properly approach the end of the sleeve with which it cooperates and pass into the sleeve for an overtravel allowance, preventing any damage to the surface or sleeve through abuse of the unit.

It will now be seen that the unit comprises only four major components—the body portion 18, bushing 27, orifice forming sleeve 20 and the plunger 21, each of which is readily fashioned separately with whatever degree of precision is required. This construction makes it possible to provide units having a maximum transverse dimension of a few eighths of an inch which will give accurate gauging results and without involving numerous or complicated parts or critical dimensional relationships.

The work contacting plunger 21 is urged into engagement with the work by a spring 34 which engages the shoulder in the body portion 10 at its inner end and is seated in a ring member abutting a snap ring 35 seated in the plunger 21 at its outer end. Another ring abuts the opposite side of the snap ring 35 and engages the inner end of the bushing 27 to limit the outward movement of the plunger 21.

Figure 4 is a section along line 4—4 of Figure 2 and shows the concentric relationship between the body portion 18, the orifice forming sleeve 20 and the projected guide portion of the plunger indicated at 28.

Figure 5 is a view looking at the outer end of the unit 10 showing the work contactor 22 and the outer end of the bushing 27. The body portion is shown with a circular outline; however, it could be square or otherwise for mounting in holders or on surfaces as desired. The guide 28 is shown in more detail in Figure 6 as it would look if viewed from the right of Figure 2. It is seen that the guide 28 has passages passing through it to allow the flow of fluid required in a gauging operation.

In Figures 7, 8 and 9 are shown modifications of the controllable orifice unit of this invention. The orifice controlling surface 19 of the unit of Figure 2 previously described is tapered. It should be noted that the modification of Figure 8 is identical to that as disclosed in Figure 2 except for the fact that its orifice controlling surface 19' is radial. Thus a given inward movement of the plunger 21' in the embodiment of Figure 8 would result in a greater decrease in flow through the orifice forming sleeve 20 than would result with the unit of Figure 2. This serves to illustrate the fact that the degree of taper of the orifice controlling surface determines the amplification of the gauge head itself. Both of the units disclosed in Figures 2 and 8 will result in a decrease of fluid leakage with inward movement of the plunger. As the plunger moves in the flow of air is decreased and the indicator in the instrument 11 will fall for plus dimensions.

The units of Figures 7 and 9 differ basically from those in Figures 2 and 8 in that they act reversely. The orifice controlling surfaces of these latter embodiments as indicated at 36 and 36' respectively are situated at the inner end of the orifice forming sleeves which they control. Thus upon inward movement of the plungers in these units the flow through the orifice forming sleeve will increase and the response of the instrument 11 to these units will be a rise in the indicator position with an increase in work dimension or movement of the work toward the unit. Noting Figure 7 in particular the inner guiding surface of the unit in that figure is provided by a reduced section 37 on the plunger which has grooves 38 along its length allowing the passage of air through these grooves and to atmosphere after it has passed between the orifice controlling surface 36 and the inner end of the orifice forming sleeve. The inner guide of the modification of Figure 9 is the same as that of Figure 7.

With the teaching of this invention no expensive masters are required to calibrate or set up the orifice units with the indicating instrument. The work contactor 22 has an inner radial finished surfaces 23. The outer face of the bushing 27 is also finished and in the assembled unit this surface is parallel to the finished surface on the work contactor. Inexpensive feeler gauges having notched outer ends as illustrated in Figure 10 are provided for use in setting up or calibrating the gauge head with the indicating instrument. By inserting these feelers, in turn, between the opposed finished surfaces on the work contactor 22 and the bushing 27 and closing these surfaces against the interposed feeler (note Figure 11) the orifice controlling surface can be positioned relative to the end of the orifice forming sleeve with which it cooperates by precise predetermined differences in clearance and the instrument response can be checked and the instrument adjusted. For example, feelers 40 and 41 might differ in thickness by a desired tolerance range and when they are applied in turn the instrument can be adjusted if necessary and the tolerance limit markers properly positioned along the instrument side. An additional feeler 42 of intermediate thickness can be used to provide an additional check of instrument response at a point between the tolerance limits. Figure 11 shows the opposing surfaces of the work contactor and the bushing closed against the maximum limit feeler 40.

Thus it is seen that a small unit comprising a few easily made parts has been provided. Because of its small dimensions and the fact that it is connected to the instrument which it controls only by a flexible tube, it can be positioned wherever desired for gauging operations. The controllable orifice unit of this invention has a unique construction wherein all dimensions which must be held precisely are minimized. The plunger is supported adjacent its outer and inner ends by surfaces of limited axial extent so there is no tendency to bind the plunger in its movement. The critical alignment between the orifice controlling surface and the end of the orifice forming sleeve with which it is associated is accurately maintained and the surface can pass into the sleeve upon overtravel. By using plungers having orifice controlling surfaces of different tapers gauge heads of different amplifications can be provided. This surface can be situated at either the inner or outer end of the orifice forming sleeve, and units can be constructed which will increase or decrease fluid leakage upon inward plunger movements. With the feelers as disclosed, a means of setting up this unit with an indicating instrument has been provided whereby the setup operation can be rapidly accomplished and wherein no expensive masters are necessary.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a gauge head for controlling air flow in a pneumatic dimension measuring system, an elongated body having a longitudinal passage therethrough, an air inlet connection extending axially at one end of said passage and body for connection to an air gauge and a source of air under pressure, an annular orifice forming passage portion in said body in closed communication with said air inlet connection, means placing the downstream end of said orifice forming passage portion in communication with atmosphere, an elongated plunger slidably supported in said body passage having a gauging contact projecting outward at the other end of said body, said plunger having an air flow controlling surface coaxial therewith carried in opposition to said orifice forming passage portion and cooperating therewith to form a circular air escape area therebetween, yielding means urging said plunger outward relative to the body, means cooperating between the body and plunger limiting the outward plunger movement, said plunger having an effective range of gauging movement as the flow controlling surface approaches the orifice forming passage portion, the maximum diameter of said surface being slightly less than the minimum diameter of the orifice forming passage portion, whereby said surface can enter the orifice forming passage portion and plunger overtravel is permitted beyond the gauging range and critical flow controlling surfaces are protected from impact against one another.

2. In a gauge head for controlling air flow in a pneumatic dimension measuring system, an elongated body structure having an air inlet connection extending coaxially at one end for connection to an air gauge and a source of air under pressure, a cylindrical passage in said body structure extending coaxially thereof in closed communication with said inlet connection, said body structure having an annular orifice forming shoulder at one end of the cylindrical passage extending outward from the walls of the cylindrical passage, an exhaust flow opening through said body structure communicating with the down-stream end of said cylindrical passage and leading to atmosphere for exhausting air supplied through said inlet connection and passing through said cylindrical passage, a plunger carried in said body structure for axial movement having a work contactor projecting from the other end of the body structure and an annular flow controlling surface adjacent its inner end situated in opposition to said annular orifice forming shoulder and cooperating therewith to form a variable circular air escape area therebetween, the maximum transverse dimension of said orifice controlling surface being slightly less than the diameter of said cylindrical passage to the extent of a clearance to allow entry of the surface therewith, and means carrying said plunger in said body structure for axial sliding relative thereto and inaxial alignment with the axis of said cylindrical passage for control of the escape area through a gauging range and entry of the surface into the passage for movement through a non-gauging range.

3. In a gauge head for controlling air flow in a pneumatic system for measuring dimensions and the like, an elongated body structure having an air inlet connection extending coaxially at one end adapted for connection to an air gauge and a source of air under pressure, a cylindrical passage in said body structure having an orifice forming annular shoulder at one end, said passage being in closed communication with said air inlet connection, an exhaust flow opening through said body structure communicating with the downstream end of said cylindrical passage and leading to atmosphere, an elongted plunger, means guiding said plunger in said body structure for movement along the axis thereof in axial alignment with said cylindrical passage, said plunger having a work contactor projecting from the other end of the body structure and an imperforate, annular orifice controlling surface on said plunger adjacent its inner end suitated in opposed flow control relationship with said orifice forming annular shoulder to form a circular air escape area, said guiding means comprising a first support of limited axial extent adjacent the outer end of said plunger guiding one end of said plunger for axial sliding in said body structure and a second support adjacent the orifice controlling surface of the plunger formed as a part of said plunger and guided and supported by axial sliding in said cylindical passage, said second support having passages therethrough allowing the flow of air from said inlet connection past said second support and through said passage to said exhaust flow opening, the spacing between the first and second supports being substantially greater than the lengths of said supports and said supports cooperating to collectively determine the axis of the plunger with respect to the body.

4. In a gauge head for controlling air flow in a pneumatic system for measuring dimensions and the like, an elongated body structure having an air inlet connection at one end for connection to an air gauge and a source of air under pressure, an orifice forming sleeve carried in said body structure having a circular passage in closed communication with said air inlet connection, an exhaust flow opening through said body structure communicating with the downstream end of the passage through said orifice forming sleeve and leading to atmosphere for exhausting air supplied through said inlet connection and passing through said sleeve, a plunger carried in said body structure for movement along the axis thereof having a work contactor projecting from the other end of the body structure and an annular orifice controlling surface adjacent its inner end situated in coaxial flow controlling relationship with one end of said orifice forming sleeve to form a circular air escape area therebetween, the means supporting said plunger in said body structure comprising a first support of limited axial extent, situated adjacent the outer end of said body structure supporting the outer end of said plunger for axial sliding, and a second support adjacent the orifice controlling surface of the plunger formed as a part of said plunger guided by axial sliding engagement in said orifice forming sleeve, said second support having passages therethrough allowing the flow of fluid past second support and through said orifice forming sleeve.

5. In a gauge head for controlling air flow in a pneumatic system for measuring dimensions and the like, an elongated body having a longitudinal passage therethrough, an air inlet connection at one end of said passage and body for connection to an air gauge and a source of air under pressure, said passage having a cylindrical passage portion and a annular surface coaxial with said passage portion extending outwardly relative thereto, means for exhausting air from said body to atmosphere downstream of said annular surface and cylindrical passage portion, an elongated plunger slidably supported in said body passage having a gauging contact projecting outward at the other end of said body, said plunger having an annular air flow controlling surface coaxial therewith in opposition to and cooperating with said annular passage surface to provide a circular air escape area for flow control upon endwise plunger movement during gauging, yielding means urging said plunger outward relative to the body, limit means cooperating between the body and plunger limiting the outward plunger movement, guide means on said plunger axially spaced from said flow controlling surface slidably supported in said cylindrical passage portion, said guide means having passage means therethrough for air flow from said inlet connection past the guide means and through the cylindrical passage portion to atmosphere, the maximum transverse dimension of said annular flow controlling surface and said guide means being substantially equal and slightly less than the diameter of said cylindrical passage to allow movement of said flow controlling surface into said cylindrical passage portion through a range in one direction beyond the gauging range.

6. A gauge head as set forth in claim 5 wherein said plunger guide means is cylindrical and has longitudinal grooves in its outer passage engaging surface providing said passage means.

7. A gauge head as set forth in claim 5 wherein said annular flow controlling surface is positioned downstream of the annular passage portion in its effective gauging range to approach said cylindrical passage portion for flow control upon inward plunger movement through a normal gauging range, and passes into said cylindrical passage portion during overtravel beyond the gauging range to protect critical flow controlling surfaces.

8. In a gauge head for controlling air flow in a pneumatic dimension measuring system, a longitudinally extended body member having a uniform maximum transverse dimension extending through a major portion of its length and having an air inlet connection extending coaxially thereof at one end for connection to an air gauge and a source of air under pressure, a passage along the axis of said body member formed by two coaxial cylindrical hole portions of different diameters, the smaller of said cylindrical portions being adjacent the air inlet connection end of said body member, a radial shoulder being formed in said body where the cylindrical hole portions join, an orifice forming sleeve having a projection of the same diameter as the smaller of said cylindrical portions inserted thereinto and a radially projecting shoulder portion in abutment with said radial shoulder, a bushing insert in said body having an external diameter engaging the larger cylindrical hole portion and a projecting shoulder engaging the outer end of said body member, said bushing having a longitudinal hole therethrough with a section of limited axial extent and reduced diameter adjacent its outer end, a plunger carried in said unit having a work contactor projecting at the outer end of the body member and an annular orifice controlling surface adjacent its inner end situated in controlling relationship with one end of said orifice forming sleeve, the outer end of said plunger being slidably mounted in the reduced hole section of said bushing, said plunger having a radially enlarged portion adjacent its inner end slidably guided in said orifice forming sleeve, said enlarged portion having passages therethrough to allow flow of air through said sleeve passage.

9. In a gauging head for controlling air flow in a pneumatic system for measuring dimensions and the like, a body having an air inlet connection at one end adapted to be connected to an air gauge and a source of air under pressure, said body having a longitudinal passage extending therethrough from the inlet connection, an elongated plunger in said passage having a work contacting end extending from one end of the body, the passage in the body providing first and second axially spaced bearing portions slidably carrying said plunger, the first of said bearing portions carrying the plunger near its work contacting end, means for limiting axial movement of the plunger including a projecting member carried by the plunger between the bearing portions, one part of the passage providing an orifice hole and the plunger at a point remote from its work contacting end having an orifice controlling part cooperating with the orifice hole to form an annular orifice space variable throughout a normal gauging range of plunger movement, the size of said orifice controlling part of the plunger being less than the minimum diameter of the orifice hole so that it is prevented from contacting the orifice hole but can move freely thereinto beyond the gauging range.

10. In a gauging head as set forth in claim 9, the orifice controlling part of the plunger and the orifice hole being located between the second of said bearing portions and said inlet connection.

11. In a gauging head as set forth in claim 9, the first and second bearing portions of the passage each being of limited axial extent as compared with the spacing between the bearing portions, and said plunger having a radially projecting portion of small axial extent as compared with the length of said second bearing portion and slidable therein.

12. In a gauging head as set forth in claim 9, said body comprising first and second coaxial connected body sections respectively providing adjoining lengths of said passage in which said first and second bearing portions are respectively located.

13. In a gauging head as set forth in claim 9, said body comprising first and second coaxial connected body sections respectively providing adjoining lengths of said passage in which said first and second bearing portions are respectively located, the first and second bearing portions being of limited axial extent as compared with the spacing between the bearing portions, said plunger having a radially projecting portion of small axial extent as compared with the length of said second bearing portion and slidable therein, the orifice controlling part of the plunger and the orifice hole being located between the second of said bearing portions and said inlet connection, and the orifice controlling part of the plunger being provided by a surface on said plunger tapering inwardly beyond a cylindrical plunger surface having a diameter smaller than the minimum diameter of said orifice hole for entry thereinto.

References Cited in the file of this patent

UNITED STATES PATENTS

| | | |
|---|---|---|
| 637,782 | Hemenway | Nov. 28, 1899 |
| 1,425,088 | Hayes | Aug. 8, 1922 |
| 1,494,966 | Twardowsky | May 20, 1924 |
| 1,678,459 | Bowland | July 24, 1928 |
| 1,763,687 | Chadwick | June 17, 1930 |
| 2,223,987 | Firth | Dec. 3, 1940 |
| 2,392,016 | Wattebot | Jan. 1, 1946 |
| 2,493,804 | Carlson | Jan. 10, 1950 |
| 2,626,464 | Mennesson | Jan. 27, 1953 |